United States Patent
Zuver et al.

(10) Patent No.: US 8,972,596 B2
(45) Date of Patent: Mar. 3, 2015

(54) SYSTEM AND METHOD FOR EFFECTING COMMUNICATIONS AMONG DEVICES IN DIFFERENT DOMAINS EMPLOYING DIFFERENT OPERATING PROTOCOLS

(75) Inventors: Christopher Kenneth Zuver, St. Peters, MO (US); Carl Joseph Hanks, St. Louis, MO (US); Fernando A. Zamith, St. Louis City, MO (US); Ronald J. Howard, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 638 days.

(21) Appl. No.: 12/431,048

(22) Filed: Apr. 28, 2009

(65) Prior Publication Data

US 2010/0274898 A1    Oct. 28, 2010

(51) Int. Cl.
*G06F 15/16* (2006.01)
*H04L 12/701* (2013.01)
*H04L 12/715* (2013.01)
*H04L 29/06* (2006.01)

(52) U.S. Cl.
CPC ............ *H04L 45/00* (2013.01); *H04L 45/04* (2013.01); *H04L 69/08* (2013.01); *H04L 69/24* (2013.01)
USPC ......................................... 709/230

(58) Field of Classification Search
USPC ................ 709/230, 235, 236, 249, 250; 370/310.1, 310.2, 332
See application file for complete search history.

(56) References Cited

U.S. PATENT DOCUMENTS

| | | | | |
|---|---|---|---|---|
| 6,049,819 | A * | 4/2000 | Buckle et al. | 709/202 |
| 6,154,778 | A * | 11/2000 | Koistinen et al. | 709/228 |
| 6,285,658 | B1 * | 9/2001 | Packer | 370/230 |
| 6,487,206 | B1 * | 11/2002 | Baruch et al. | 370/395.1 |
| 6,535,507 | B1 * | 3/2003 | Li et al. | 370/356 |
| 6,556,659 | B1 * | 4/2003 | Bowman-Amuah | 379/9.04 |
| 6,621,895 | B1 * | 9/2003 | Giese | 379/201.03 |

(Continued)

FOREIGN PATENT DOCUMENTS

| | | | | |
|---|---|---|---|---|
| EP | 1059792 | A2 * | 12/2000 | H04L 29/06 |
| EP | 1059792 | A3 | 7/2002 | |

(Continued)

OTHER PUBLICATIONS

Wikipedia, Service level agreement, pp. 1-4.*

(Continued)

*Primary Examiner* — Backhean Tiv
(74) *Attorney, Agent, or Firm* — Armstrong Teasdale LLP

(57) ABSTRACT

A system for effecting communications among a plurality of devices situated in a plurality of domains employing differing operating protocols; the system including: (a) at least one topology agent situated in a source domain of the domains and configured for effecting operation of the system among the domains; (b) at least one negotiator agent situated between the source domain and a respective other domain and configured for selective coupling with a respective topology agent; the at least one negotiator agent implementing quality of service parameters provided by the respective topology agent to convey communications from the source domain to the other domain; and (c) a plurality of proxy agents; at least one proxy agent being situated in each respective other domain and configured for implementing quality of service policies received from the respective negotiator agent to effect the communications within the respective other domain.

20 Claims, 4 Drawing Sheets

(56) References Cited

U.S. PATENT DOCUMENTS

| | | | |
|---|---|---|---|
| 6,631,122 B1* | 10/2003 | Arunachalam et al. | 370/332 |
| 7,010,615 B1* | 3/2006 | Tezuka et al. | 709/246 |
| 7,065,053 B2* | 6/2006 | Godin et al. | 370/252 |
| 7,190,698 B2* | 3/2007 | Svanberg et al. | 370/395.2 |
| 7,212,491 B2* | 5/2007 | Koga | 370/229 |
| 7,254,645 B2* | 8/2007 | Nishi | 709/249 |
| 7,433,944 B2* | 10/2008 | Kanada et al. | 709/223 |
| 7,602,723 B2* | 10/2009 | Mandato et al. | 370/236 |
| 7,613,457 B2* | 11/2009 | Gao et al. | 455/444 |
| 7,633,958 B2* | 12/2009 | Chen et al. | 370/401 |
| 7,653,735 B2* | 1/2010 | Mandato et al. | 709/231 |
| 7,672,313 B2* | 3/2010 | Qing et al. | 370/395.5 |
| 7,707,271 B2* | 4/2010 | Rudkin et al. | 709/218 |
| 7,747,730 B1* | 6/2010 | Harlow | 709/224 |
| 7,924,715 B2* | 4/2011 | Ravindran et al. | 370/230 |
| 8,131,851 B2* | 3/2012 | Harlow | 709/224 |
| 2002/0036982 A1* | 3/2002 | Chen | 370/230 |
| 2002/0039352 A1* | 4/2002 | El-Fekih et al. | 370/252 |
| 2003/0079056 A1* | 4/2003 | Taylor | 710/1 |
| 2003/0123438 A1* | 7/2003 | Li et al. | 370/356 |
| 2004/0067754 A1* | 4/2004 | Gao et al. | 455/442 |
| 2004/0228304 A1* | 11/2004 | Riedel et al. | 370/332 |
| 2005/0027870 A1* | 2/2005 | Trebes | 709/227 |
| 2005/0283832 A1* | 12/2005 | Pragada et al. | 726/12 |
| 2006/0268683 A1* | 11/2006 | Dhesikan et al. | 370/216 |
| 2007/0211632 A1* | 9/2007 | Song et al. | 370/230 |
| 2008/0016221 A1* | 1/2008 | Xu et al. | 709/226 |
| 2008/0181117 A1* | 7/2008 | Acke et al. | 370/236.2 |
| 2008/0212591 A1* | 9/2008 | Wu et al. | 370/395.21 |
| 2009/0116380 A1* | 5/2009 | Santiago et al. | 370/229 |
| 2009/0122707 A1* | 5/2009 | Weinman | 370/237 |
| 2009/0207828 A1* | 8/2009 | Pragada et al. | 370/338 |
| 2009/0279444 A1* | 11/2009 | Ravindran et al. | 370/252 |
| 2010/0036953 A1* | 2/2010 | Bogovic et al. | 709/226 |
| 2010/0274898 A1* | 10/2010 | Zuver et al. | 709/226 |

FOREIGN PATENT DOCUMENTS

| | | | | |
|---|---|---|---|---|
| EP | 1250021 A1 * | 10/2002 | | H04Q 7/38 |
| EP | 1841144 A1 * | 10/2007 | | H04L 12/56 |

OTHER PUBLICATIONS

Wikipedia, Diffeerentiated services, pp. 1-7.*
Bernet, et al, A Framework for Integrated Services Operation over Diffserv Networks, Nov. 2000, RFC 2998, pp. 1-27.*
Braden, et al., Integrated Services in the Internet Architecture: an Overview, Jul. 1994, RFC 1633, pp. 1-28.*
Yang, et all, An End to End QoS Framework with On-Demand Bandwidth Reconfiguration, IEEE, 2004, pp. 1-12.*
Nichols, et al, Definition of Differentiated Services Per Domain Behaviors and Rules for their Specification, Apr. 2001, RFC 3086, pp. 1-21.*
Wikipedia, List of network protocols, pp. 1-5.*
Ogura, T, et al, Internet Protocol Version 6 over MAPOS(Multiple Access Protocol Over SONET/SDH), Jul. 2003, RFC 3572, pp. 1-12.*
Laubach, M, Classical IP and ARP over ATM, Jan. 1994, RFC 1577, pp. 1-15.*
PCT International Search Report; International Application No. PCT/US2010/027489; Jul. 15, 2010.

* cited by examiner

SYSTEM AND METHOD FOR EFFECTING COMMUNICATIONS AMONG DEVICES IN DIFFERENT DOMAINS EMPLOYING DIFFERENT OPERATING PROTOCOLS

TECHNICAL FIELD

The present invention may be directed to managing communications among networks, and especially to agent-based Quality of Service (QoS) based network management of a heterogeneous networked system of systems.

BACKGROUND

No current system or solution is known to exist which permits a single user to manage, setup, modify, and remove Quality of Service (QoS) contracts over disparate systems or networks. Each equipment manufacturer has developed its own solution. Standards are not known to have emerged in industry to address a single source control mechanism. Such a lack of capability for a single user to manage disparate systems may yield a system that disadvantageously is a human-intensive process, may be error prone, and may require verbal or written coordination among multiple human administrators. Such limited prior art systems may require that each equipment manufacturer must define and support a different interaction structure or method and may require different equipment configurations. Ad hoc networks and network isolations may not be accommodated using such a prior art system.

There is a need for a system and method for effecting communications among devices in different domains employing different operating protocols.

There is a need for a system and method to effect managing and setup of end-to-end Quality of Service contracts over different network technologies and vendor products with a single homogenous interface or solution.

SUMMARY

A system for effecting communications among a plurality of devices situated in a plurality of domains employing differing operating protocols; the system including: (a) at least one topology agent situated in a source domain of the domains and configured for effecting operation of the system among the domains; (b) at least one negotiator agent situated between the source domain and a respective other domain and configured for selective coupling with a respective topology agent; the at least one negotiator agent implementing quality of service parameters provided by the respective topology agent to convey communications from the source domain to the other domain; and (c) a plurality of proxy agents; at least one proxy agent being situated in each respective other domain and configured for implementing quality of service policies received from the respective negotiator agent to effect the communications within the respective other domain.

A method for effecting communications among a plurality of devices situated in a plurality of domains; respective domains of the plurality of domains employing differing operating protocols; the method comprising:

(a) in no particular order:

(1) providing at least one topology agent providing unit situated in a source domain of the plurality of domains and configured for effecting operation of the system among the plurality of domains;

(2) providing at least one negotiator agent operating unit situated between the source domain and a respective other domain of the plurality of domains than the source domain and configured for selective coupling with a respective topology agent providing unit of the at least one topology agent providing unit; and (3) providing a plurality of proxy agent operating units; at least one proxy agent operating unit of the plurality of proxy agent operating units being situated in each the respective other domain;

(b) operating the at least one negotiator agent operating unit to effect implementing quality of service parameters provided by the respective topology agent providing unit to convey communications from the source domain to the respective other domain; and (c) operating selected proxy agent operating units of the plurality of proxy agent operating units to effect implementing quality of service policies received from the respective negotiator agent operating unit to effect the communications within the respective other domain.

It is, therefore, a feature of the present disclosure to provide a system and method for effecting communications among devices in different domains employing different operating protocols.

It is a further feature of the present disclosure to provide a system and method to effect managing and setup of end-to-end Quality of Service contracts over different network technologies and vendor products with a single homogenous interface or solution.

Further features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

Figure 1:
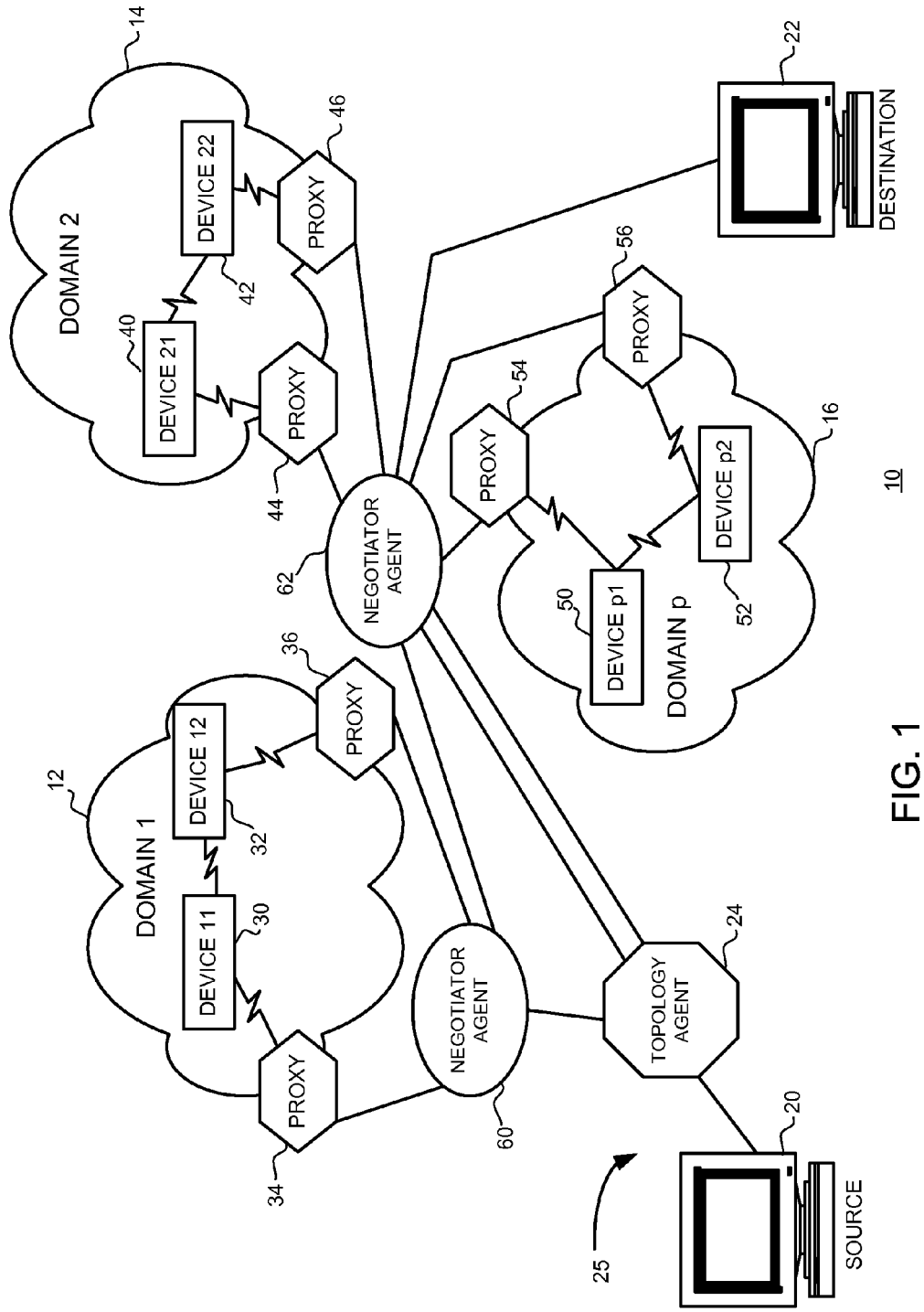
FIG. 1 is a schematic diagram of a representative employment of the present disclosure.

FIG. 1 is a schematic diagram of a representative employment of the present disclosure. In FIG. 1, a network system 10 may include a first network 12, a second network 14, and a pth network 16. The indicator "p" is employed to signify that there can be any number of networks in network system 10. The inclusion of three networks 12, 14, 16 in FIG. 1 is illustrative only and does not constitute any limitation regarding the number of networks that may be included in a network system in which the present disclosure may be employed.

A source 20 may initiate messages, instructions, or other communications for use by a destination 22. Each network 12, 14, 16 may have internally situated devices operating according to a respective network protocol. For purposes of this disclosure, the terms "network" and "domain" may be used interchangeably. Operating protocols for networks 12, 14, 16 may not be the same. Thus, network 12 may have internal devices 30, 32 operating according to a first network protocol. Network 14 may have internal devices 40, 42 operating according to a second network protocol. Network 16 may have internal devices 50, 52 operating according to a pth network protocol.

Using prior art devices and methods to arrange for communications across all of networks 12, 14, 16 may have been effected by a network administrator (not shown in FIG. 1) to identify and accommodate underlying system details which may hinder communications by or management of networks 12, 14, 16. Such communication by or management of a plurality of networks may have consumed significant amounts of an administrator's time, labor and resources and may have been error prone.

FIG. 1 illustrates elements of the system of the present disclosure that may permit managing networks such as networks 12, 14, 16 using agent-based units to accommodate differing operating protocols employed by networks 12, 14, 16. Agent based units embodied in frameworks designed for accepting industry standard parameters may be employed to permit trans-network communications. By way of example and not by way of limitation, Quality of Service (QoS) is an IEEE (Institute of Electrical and Electronic Engineers) standard protocol that may be advantageously employed in exercising the present disclosure.

A topology agent providing unit or topology agent 24 may be employed in cooperation with source 20 to establish a QoS policy for managing a configuration. Topology agent 24 and source 20 may be regarded as comprising a source domain 25. By way of example and not by way of limitation, a QoS policy may include at least one of a bandwidth lfimit and a priority level for employment in complying with the policy.

Source 20 and destination 22 need not necessarily interact with topology agent 24 (or any other agent such as, by way of example and not by way of limitation, negotiator agents 60, 62; described below). Lack of source-to-agent interaction may exist, by way of example and not by way of limitation, in legacy systems to which the present disclosure may be adapted; in such legacy systems agents 24, 60 62 may be unknown to source 20.

For purposes of this disclosure, the term "agent" may be taken to mean a unit that acts for a user in a relationship of agency. The "action on behalf of" aspect of the agency relationship may imply an authority to decide whether action is appropriate and, if so, which action is appropriate. An "agent" may be configured as a software agent, and may act for another software program in an agency relationship. An agent may be invoked not only for accomplishing a task, but may be empowered to activate itself to accomplish a predetermined goal as allowed by a policy, such as, by way of example and not by way of limitation, a QoS policy.

An agent may exhibit some aspects of artificial intelligence, such as learning and reasoning. An agent may be capable of autonomous action such as, by way of example and not by way of limitation, modifying how it achieves objectives. An agent may be distributive; capable of being executed or operating on physically distinct platforms. An agent may be collaborative in that an agent not having a capability to achieve an objective operating alone may cooperate with other agents to achieve the objective. Agents may be mobile in that an agent may have an ability to relocate its execution onto different platforms or processors.

The system of the present disclosure may operationally bridge a plurality of networks 12, 14, 16 by wrapping each network 12, 14, 16 with the system at an ingress or egress of the respective network 12, 14, 16 by establishing an abstract operating level by employing a industry standard, such as QoS. This may be carried out using a proxy agent operating unit or proxy agent at an ingress or an egress of each respective network 12, 14, 16. Thus, proxy agent operating units 34, 36 may be coupled with network 12 appropriately to be involved in communications entering or leaving network 12. Proxy agent operating units 44, 46 may be coupled with network 14 appropriately to be involved in communications entering or leaving network 14. Proxy agent operating units 54, 56 may be coupled with network 16 appropriately to be involved in communications entering or leaving network 16.

Negotiator agent operating units or negotiator agents 60, 62 may be employed between source 20 and networks 12, 14, 16 to effect implementing QoS policies provided by topology agent 24 to convey communications from source 20 to destination 22 via one or more of networks 12, 14, 16, as desired or required. Thus, a negotiator agent 60 may be configured for selectively coupling topology agent 24 with one or more of proxy agents 34, 36, 44, 46, 54, 56. A negotiator agent 62 may also be configured for selectively coupling topology agent 24 with one or more of proxy agents 34, 36, 44, 46, 54, 56.

Negotiator agents 60, 62 may communicate directly with topology agent 24 to determine available paths from source 20 to destination 22. Negotiator agents 60, 62 may communicate with each other to "negotiate" a QoS policy and determine whether each network 12, 14, 16 can support the policy.

The system of the present disclosure may be employed in network system 10 for effecting communications among devices 30, 32, 40, 42, 50, 52 situated in networks or domains 12, 14, 16. Network 12 may alternately be referred to as "Domain 1". Devices 30, 32 may alternately be identified with a two-digit naming protocol: the first digit ("1") may refer to a device in Domain 1; the second digit may refer to a respective device within Domain 1. Thus, Device 11 may be a first device in Domain 1; Device 12 may be a second device in Domain 1. The "zig-zag" connection between devices 30, 32 is intended to indicate that devices 30, 32 may represent a significant number (greater than two) of various devices within network or domain 12.

Network 14 may alternately be referred to as "Domain 2". Devices 40, 42 may alternately be identified with a two-digit naming protocol: the first digit ("2") may refer to a device in Domain 2; the second digit may refer to a respective device within Domain 2. Thus, Device 21 may be a first device in Domain 2; Device 22 may be a second device in Domain 2. The "zig-zag" connection between devices 40, 42 is intended to indicate that devices 40, 42 may represent a significant number (greater than two) of various devices within network or domain 14.

Network 16 may alternately be referred to as "Domain p". Devices 50, 52 may alternately be identified with a two-digit naming protocol: the first digit ("p") may refer to a device in Domain p; the second digit may refer to a respective device within Domain p. Thus, Device p1 may be a first device in Domain p; Device p2 may be a second device in Domain p. The "zig-zag" connection between devices 50, 52 is intended to indicate that devices 50, 52 may represent a significant number (greater than two) of various devices within network or domain 16.

Topology agent 24 may be configured for effecting operation of the system among the plurality of domains. One or both of negotiator agents 60, 62 may effect selective coupling with topology agent 24 for implementing industry standard parameters such as, by way of example and not by way of limitation, QoS parameters embodied in a QoS policy, provided by topology agent 24 to convey communications from source 20 to destination 22. Selected proxy agents among proxy agents 34, 36, 44, 46, 54, 56 may be situated in each network or domain 12, 14, 16 and configured for implementing the QoS parameters received from a respective negotiator agent 60, 62 to participate in presenting the communications to destination 22.

The system of the present disclosure may manage networks 12, 14, 16 to provide QoS policy negotiation utilizing agent-based software deployed on physical network devices (e.g., proxy agents 34, 36, 44, 46, 54, 56 and negotiator agents 60, 62) to negotiate QoS contracts over multiple underlying network management technologies to provide an ability to effect end-to-end QoS over domain, technology, operational, management, and vendor boundaries by providing a hierarchy of agents (e.g., topology agent, negotiator agents 60, 62 and proxy agents 34, 36, 44, 46, 54, 56) to abstract underlying systems details which may otherwise hinder management of network systems.

The system of the present disclosure is illustrated representatively in FIG. 1. The system of the present disclosure may be carried out by creating and deploying agents—topology agents, negotiator agents and proxy agents—as may be required by a particular system.

Rather than predeploying agents, frameworks may be prepositioned within network system 10 to accommodate agents conveyed to the frameworks in exercising the system of the present disclosure as they are required. Agents may be removed from frameworks when no longer needed. The frameworks may be installed in various devices within various networks or domains in network system 10 including, by way of example and not by way of limitation, gateways, routers, and similar devices.

Figure 2:
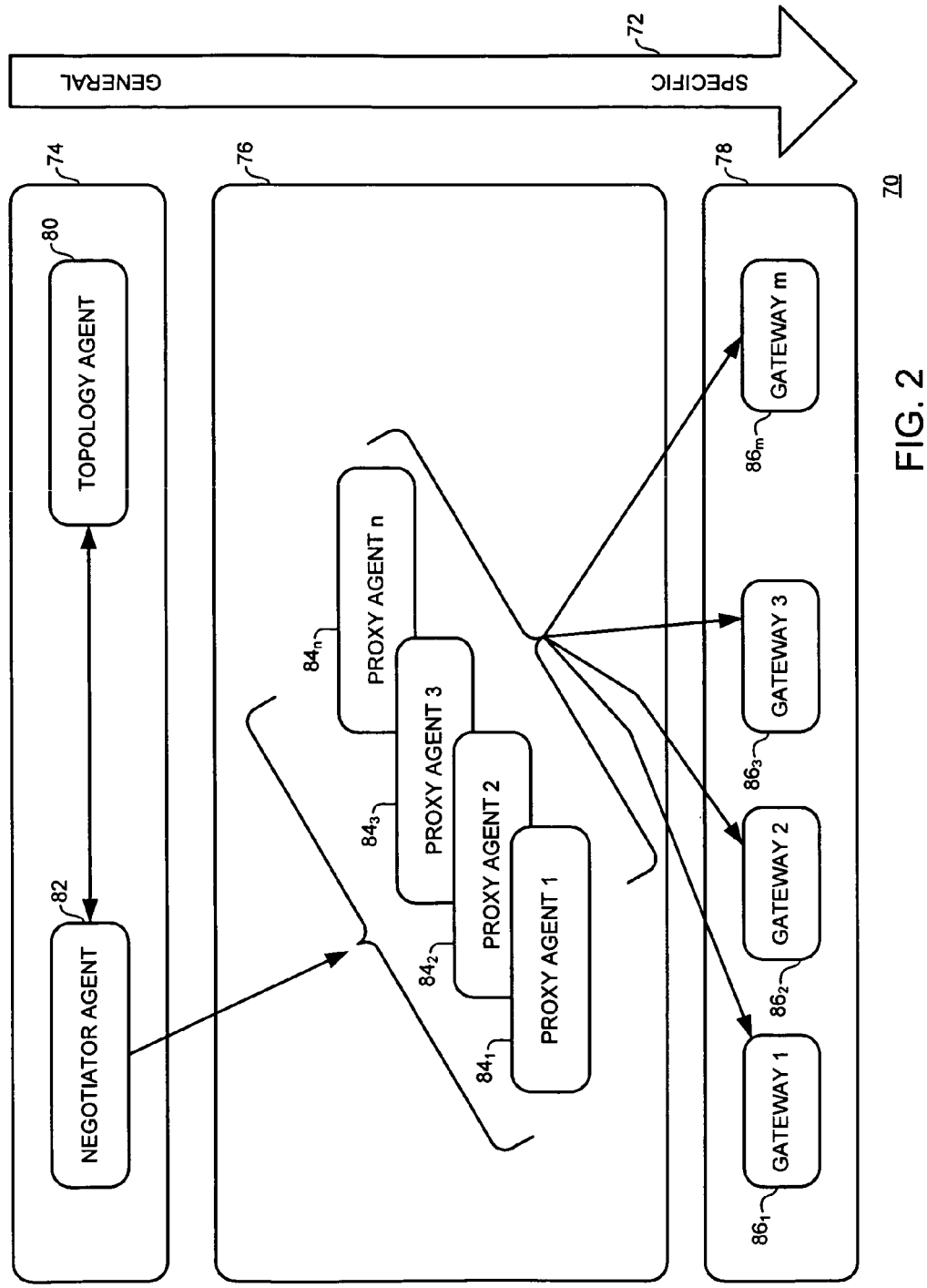
FIG. 2 is a schematic diagram illustrating a hierarchic relation among agents that may be employed with the present disclosure.

FIG. 2 is a schematic diagram illustrating a hierarchic relation among agents that may be employed with the present disclosure. In FIG. 2, a hierarchy 70 of agent units or agents may be displayed ranging, as indicated by an arrow 72, from most general tier 74 of agents, through an intermediate tier 76 of agents to a most specific level, a gateway tier 78.

Most general tier 74 may include a topology agent 80 (represented as topology agent 24; FIG. 1) and a negotiator agent 82. There may be more than one negotiator agent employed in a network system, as may be represented by negotiator agents 60, 62 in network system 10 (FIG. 1).

Intermediate tier 76 may include proxy agents $84_1$, $84_2$, $84_3$, $84_n$. The indicator "n" is employed to signify that there can be any number of proxy agents in hierarchy 70. The inclusion of four proxy agents $84_1$, $84_2$, $84_3$, $84_n$ in FIG. 2 is illustrative only and does not constitute any limitation regarding the number of proxy agents that may be included in the hierarchy 70 of the present invention.

Gateway tier 78 may indicate devices situated internally of networks or domains serviced by proxy agents $84_n$. Gateway tier 78 may include gateways $86_1$, $86_2$, $86_3$, $86_m$. Gateways $86_m$ may be included among devices 30, 32 within network or domain 12 in FIG. 1. Gateways $86_m$ may be included among devices 40, 42 within network or domain 14 in FIG. 1. Gateways $86_m$ may be included among devices 50, 52 within network or domain 16 in FIG. 1. The indicator "m" is employed to signify that there can be any number of gateways in hierarchy 70. The inclusion of four gateways $86_1$, $86_2$, $86_3$, $86_m$ in FIG. 2 is illustrative only and does not constitute any limitation regarding the number of gateways that may be included in the hierarchy 70 of the present invention.

Throughout this description, use of a reference numeral using a generic subscript herein may be taken to mean that any respective member of the plurality of elements having the same reference numeral may be regarded as included in the description. Thus, by way of example and not by way of limitation, referring to proxy agent $84_n$ in describing FIG. 2 may be taken to mean that any proxy agent—$84_1$, $84_2$, $84_3$ or $84_n$ (FIG. 2)—may be regarded as capable of employment as described.

Figure 3:
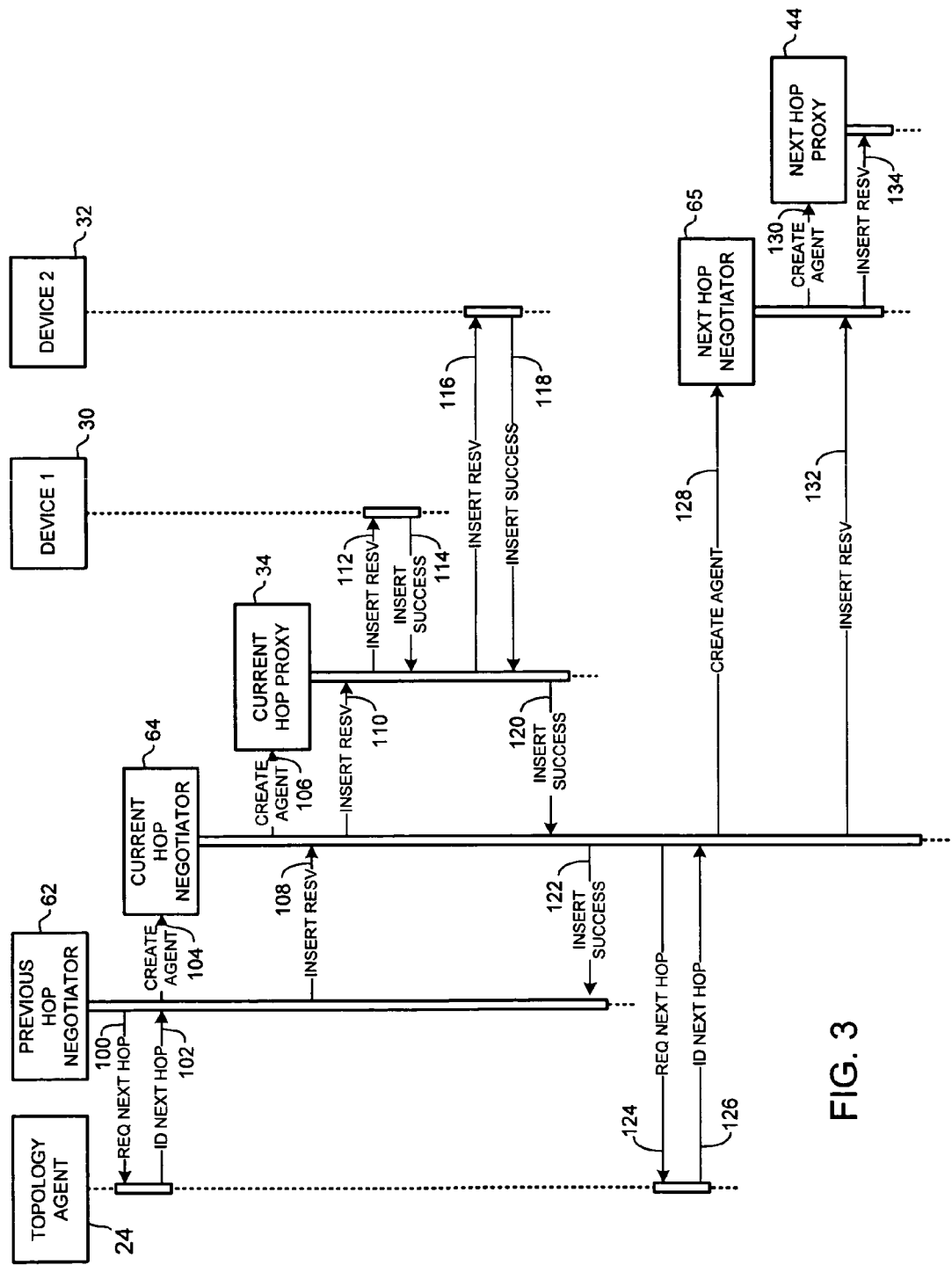
FIG. 3 is a schematic diagram of communications that may be effected in exercising the present disclosure.

FIG. 3 is a schematic diagram of communications that may be effected in exercising the present disclosure. In FIG. 3, a routing of a communication from a source (e.g., source 20; FIG. 1) toward a destination (e.g., destination 22; FIG. 1), or alternatively from a destination toward a source, may be understood using the teachings of the present disclosure. A first hop negotiator 62 (referred to as a previous hop negotiator in FIG. 3) may initiate the communication by requesting a next hop from a topology agent 24, as indicated by an arrow 100. Topology agent 24 may identify a next hop to first hop negotiator 62, as indicated by an arrow 102. Topology agent 24 may employ an industry standard format, such as by way of example and not by way of limitation, a quality of service (QoS) format in establishing and communicating identity of the next hop.

First hop negotiator 62 may use information identified by topology agent 24 to create an agent at a second hop negotiator 64 (referred to as a current hop negotiator in FIG. 3), as indicated by an arrow 104. Second hop negotiator 64 may use information identified by topology agent 24 create an agent at a current hop proxy 34, as indicated by an arrow 106.

As mentioned earlier herein, each agent—topology agent 24, hop negotiators 62, 64 and current hop proxy 34 may exercise independent judgment, learned responses or similar independent action to participate in identifying a next step in conveying a communication.

Following creation of a proxy agent in current hop proxy 34, first hop negotiator 62 may employ a quality of service (QoS) format to insert a reservation with second hop negotiator 64 (indicated by an arrow 108), and second hop negotiator 64 may insert a reservation with current hop proxy 34 (indicated by an arrow 110). Such a reservation may be recognized by second hop negotiator 64 and current hop proxy 34 and may be used by second hop negotiator 64 and current hop proxy 34 to configure for handling communications.

Current hop proxy 34 may employ a quality of service (QoS) format to insert a reservation with a device 30 (indicated by an arrow 112). Device 30 may be situated in a network (e.g., network or domain 12; FIG. 1). Device 30 may insert a success with current hop proxy 34 indicating a successful creation of an agent in a selected device (i.e., device 30) in network 12, as indicated by an arrow 114.

Current hop proxy 34 may employ a quality of service (QoS) format to insert a reservation with a device 32 (indicated by an arrow 116). Device 32 may be situated in network or domain 12 (FIG. 1). Device 32 may insert a success with current hop proxy 34 indicating a successful creation of an agent in a selected device (i.e., device 32) in network 12, as indicated by an arrow 118.

The creation of agents in selected devices within network or domain 12 may continue until agents appropriate for participation in a communication path or link traversing network or domain 12 may be established. Only two devices 30, 32 are illustrated in FIG. 3, but more than two devices may be involved.

Current hop proxy 34 may pass an indication of success in creating agents in appropriate devices for participation in a communication path or link traversing network or domain 12 back to second hop negotiator 64 (indicated by an arrow 120), and second hop negotiator 64 may pass the indication of success to first hop negotiator 62 (indicated by an arrow 122).

FIG. 3 may indicate that destination 22 (not shown in FIG. 3) is not in network or domain 12. That is, another hop traversing another network or domain must be effected to reach or communicate with destination 22. Accordingly, second hop negotiator 64 may request a next hop from a topology agent 24, as indicated by an arrow 124. Topology agent 24 may identify a next hop to second hop negotiator 64, as indicated by an arrow 126. Topology agent 24 may employ an industry standard format, such as by way of example and not by way of limitation, a quality of service (QoS) format in establishing and communicating identity of the next hop.

Second hop negotiator 64 may use information identified by topology agent 24 to create an agent at a third hop negotiator 65 (referred to as a next hop negotiator in FIG. 3), as indicated by an arrow 128. Third hop negotiator 65 may use information identified by topology agent 24 create an agent at a next hop proxy 44, as indicated by an arrow 130.

As mentioned earlier herein, each agent—topology agent 24, hop negotiators 64, 65 and next hop proxy 44 may exercise independent judgment, learned responses or similar independent action to participate in identifying a next step in conveying a communication.

Following creation of a proxy agent in next hop proxy 44, second hop negotiator 64 may employ a quality of service (QoS) format to insert a reservation with third hop negotiator 65 (indicated by an arrow 132), and third hop negotiator 65 may insert a reservation with next hop proxy 44 (indicated by an arrow 134). Such a reservation may be recognized by third hop negotiator 65 and next hop proxy 44 and may be used by third hop negotiator 65 and next hop proxy 44 to configure for handling communications.

Next hop proxy 44 may employ a quality of service (QoS) format to insert reservations with devices in a network served by next hop proxy 44 (e.g., network or domain 14, FIG. 1) and may receive indications of successful creation of agents with selected devices (not shown in FIG. 3). The creation of agents in selected devices within network or domain 14 may continue until agents appropriate for participation in a communication path or link traversing network or domain 14 may be established, substantially as described above in connection with operation of current hop proxy 34.

Next hop proxy 44 may provide an indication of success in creating agents in appropriate devices for participation in a communication path or link traversing network or domain 14 back to third hop negotiator 65, and third hop negotiator 65 may pass the indication of success to second hop negotiator 64 (not shown in FIG. 3).

In order to avoid prolixity and avoid cluttering FIG. 3, only a portion of an operation to establish communication between source 20 and destination 22 (source 20 and destination 22 are not shown in FIG. 3; see FIG. 1) is illustrated in FIG. 3. Once all hop negotiators 62, 64, 65 and others not illustrated in FIG. 3 are successful the operation may propagate back to the first hop negotiator 62 and the reservation or QoS policy may be set up to effect the desired communication. One skilled in the art of network system design may apply the teaching of the present disclosure iteratively among a plurality of networks to effect communications between source 20 and destination 22.

Figure 4:
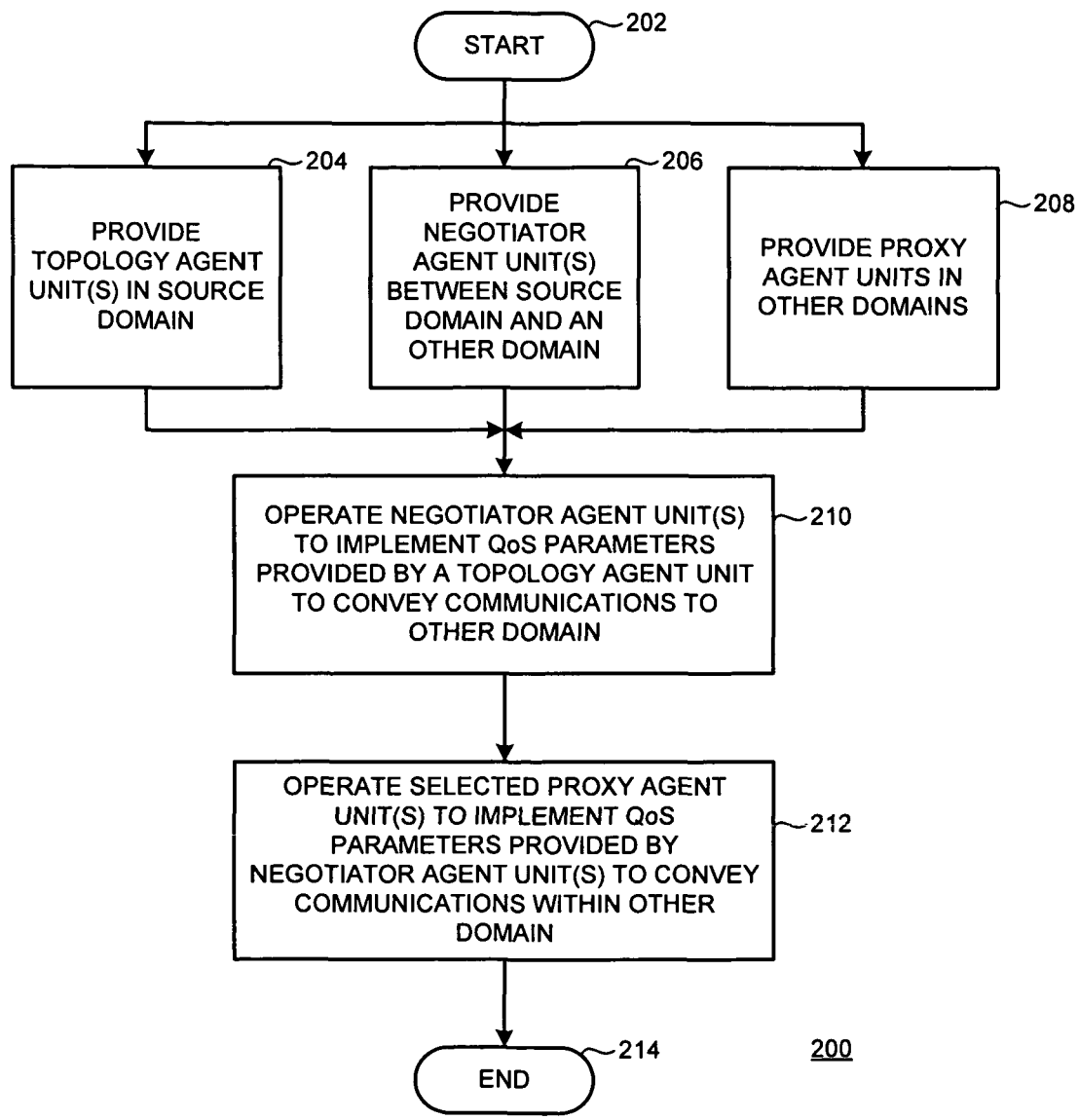
FIG. 4 is a flow diagram illustrating the method of the present disclosure.

FIG. 4 is a flow diagram illustrating the method of the present disclosure. In FIG. 4, a method 200 for effecting communications among a plurality of devices situated in a plurality of domains may begin at a START locus 202. Respective domains of the plurality of domains employ differing operating protocols.

Method 200 may continue with, in no particular order: (1) providing at least one topology agent providing unit situated in a source domain of the plurality of domains (see FIG. 1, element 25) and configured for effecting operation of the system among the plurality of domains, as indicated by a block 204; (2) providing at least one negotiator agent operating unit situated between the source domain and a respective other domain of the plurality of domains than the source domain and configured for selective coupling with a respective topology agent providing unit of the at least one topology agent providing unit, as indicated by a block 206; and (3) providing a plurality of proxy agent operating units; at least one proxy agent operating unit of the plurality of proxy agent operating units being situated in each the respective other domain, as indicated by a block 208.

Method 200 may continue with operating the at least one negotiator agent operating unit to effect implementing quality of service parameters provided by the respective topology agent providing unit to convey communications from the source domain to the respective other domain, as indicated by a block 210.

Method 200 may continue with operating selected proxy agent operating units of the plurality of proxy agent operating units to effect implementing quality of service policies received from the respective negotiator agent operating unit to effect communications within the respective other domain, as indicated by a block 212.

Method 200 may terminate at an END locus 214.

Prior art solutions may not meet the need of mobile or ad hoc networks. Prior art solution may be prone to network isolation and may be human intensive with a small set of knowledgeable administrators. The present disclosure may abstract networking management to an operational context and may allow end users to insert, modify and remove Quality of Service contracts.

The system and method of the present disclosure may distribute business logic for configuration of devices onto the physical devices they manage as opposed to a central monolithic software controller. The system and method of the present disclosure may employ abstraction to remove the necessity of programming point solutions for each vendor or equipment manufacturer. The system and method of the present disclosure may provide management and setup using an industry standard such as, by way of example and not by way of limitation, quality of service (QoS) to bridge multiple industry standards through abstraction. The system and method of the present disclosure may employ QoS policy to bridge over networks out of the reach of a network administrator by allowing the wrapping of the network with the system at the ingress to and egress from the network. The system and method of the present disclosure may componentize distributed logic to allow running on devices from various manufacturers. The system and method of the present disclosure may componentized distributed logic to allow running on devices of various resource availability and constraints.

QoS may be implemented in more than one technology. By way of example and not by way of limitation QoS may be implemented in INTSERV (Internet Services) technology or DIFFSERV (Differential Services) technology. The system and method of the present disclosure may allow a single network administrator to insert, modify and remove QoS contracts across multiple networks and across different QoS technologies with a single interface.

The system and method of the present disclosure may enable network administrators to insert, modify and remove Quality of Service contracts without a need for a centralized server so that network isolation may not interfere in network management.

The system and method of the present disclosure may permit managing heterogeneous networks to provide QoS policy negotiation utilizing agent-based software deployed on physical network devices to negotiate QoS contracts over multiple underlying network management technologies. The system and method of the present disclosure may provide an ability to provide end-to-end QoS over domain, technology, operational, management, and vendor boundaries by providing a hierarchy of agents to abstract underlying systems details which may currently hinder management of network systems.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A system for effecting communications among a plurality of devices situated in a plurality of domains; the system comprising:

a topology agent providing unit situated in a source domain of said plurality of domains and configured for effecting operation of the system among said plurality of domains; respective domains of said plurality of domains employing differing operating protocols;

a plurality of negotiator agent operating units situated between said source domain and a plurality of respective other domains of said plurality of domains than said source domain and coupled with said topology agent providing unit; said topology agent providing unit being directly coupled with a plurality of selected negotiator agent operating units of said plurality of negotiator agent operating units; each respective negotiator agent operating unit of said plurality of negotiator agent operating units implementing industry standard parameters provided by said topology agent providing unit to convey communications from said source domain to at least one other domain of said plurality of respective other domains, at least one negotiator agent operating unit of said plurality of negotiator agent operating units configured to receive information from said topology agent providing unit regarding a hop to a selected domain of said plurality of respective other domains and to generate an agent in said selected domain for receiving instructions from the at least one negotiator agent operating unit, such that a path is established between said source domain and a destination domain; and a plurality of proxy agent operating units; at least one proxy agent operating unit of said plurality of proxy agent operating units being coupled with a respective other domain of said plurality of respective other domains for configuring at least one device, other than one of said plurality of proxy agent operating units, in said respective other domain for implementing said industry standard parameters received from said respective negotiator agent operating unit to effect said communications within said respective other domain; said at least one device being configured to include a framework for accepting said industry standard parameters.

2. The system for effecting communications among a plurality of devices situated in a plurality of domains as recited in claim 1 wherein a respective said domain is defined by a technology type.

3. The system for effecting communications among a plurality of devices situated in a plurality of domains as recited in claim 1 wherein a respective said domain is defined as including devices serviced by a respective gateway element.

4. The system for effecting communications among a plurality of devices situated in a plurality of domains as recited in claim 1 wherein a respective said domain is defined as including devices serviced by a respective quality of service technology.

5. The system for effecting communications among a plurality of devices situated in a plurality of domains as recited in claim 4 wherein said quality of service technology is expressed in policies that include at least one of a bandwidth limit and a priority level.

6. The system for effecting communications among a plurality of devices situated in a plurality of domains as recited in claim 1 wherein a respective said domain is defined as at least one of a technology type, as including devices serviced by a respective gateway element, and as including devices serviced by a respective quality of service technology.

7. The system for effecting communications among a plurality of devices situated in a plurality of domains as recited in claim 6 wherein said quality of service technology is expressed in policies that include at least one of a bandwidth limit and a priority level.

8. A system for effecting communications between a source and a device; the system comprising:

a topology agent providing unit situated with said source and configured for effecting operation of the system between said source and said device via a plurality of second domains; said source employing a first operating protocol; each respective second domain of said plurality of second domains employing an other operating protocol different than said first operating protocol;

a plurality of negotiator agent operating units situated between said source and said plurality of second domains and configured for coupling with said topology agent providing unit; said topology agent providing unit being directly coupled with each respective negotiator agent operating unit of said plurality of negotiator agent operating units; each said respective negotiator agent operating unit implementing quality of service parameters provided by said topology agent providing unit to convey communications from said source to said plurality of second domains, at least one negotiator agent operating unit of said plurality of negotiator agent operating units configured to receive information from said topology agent providing unit regarding a hop to a selected domain of said plurality of respective other domains and to generate an agent in said selected domain for receiving instructions from the at least one negotiator agent operating unit, such that a path is established between said source domain and a destination domain; and at least one proxy agent operating unit situated in said plurality of second domains; said at least one proxy agent operating unit being coupled with said plurality of second domains for configuring at least one device, other than one of said plurality of proxy agent operating units, situated in said plurality of second domains for implementing quality of service policies received from said respective negotiator agent operating unit to effect said communications with said at least one device; said at least one device being configured to include a framework for accepting said quality of service parameters.

9. A system for effecting communications between a source and a device as recited in claim 8 wherein said at least one second domain is defined by a technology type.

10. A system for effecting communications between a source and a device as recited in claim 8 wherein said at least one second domain is defined as including devices serviced by a respective gateway element.

11. A system for effecting communications between a source and a device as recited in claim 8 wherein said at least one second domain is defined as including devices serviced by a respective quality of service technology.

12. A system for effecting communications between a source and a device as recited in claim 8 wherein said quality of service policies include at least one of a bandwidth limit and a priority level.

13. A system for effecting communications between a source and a device as recited in claim 8 wherein said at least one second domain is defined as at least one of a technology type, as including devices serviced by a respective gateway element, and as including devices serviced by a respective quality of service technology.

14. A system for effecting communications between a source and a device as recited in claim 13 wherein said quality of service policies include at least one of a bandwidth limit and a priority level.

15. A method for effecting communications among a plurality of devices situated in a plurality of domains; the method comprising:
  (a) in no particular order:
    (1) providing a topology agent providing unit situated in a source domain of said plurality of domains and configured for effecting operation of the system among said plurality of domains; respective domains of said plurality of domains employing differing operating protocols;
    (2) providing a plurality of negotiator agent operating units situated between said source domain and a plurality of other domains of said plurality of domains than said source domain and configured for selective coupling with said topology agent providing unit; said topology agent providing unit being directly coupled with a plurality of selected negotiator agent operating units of said plurality of negotiator agent operating units; and
    (3) providing a plurality of proxy agent operating units; at least one proxy agent operating unit of said plurality of proxy agent operating units being coupled with a respective other domain of said plurality of other domains;
  (b) operating each respective negotiator agent operating unit of said plurality of negotiator agent operating units to effect implementing quality of service parameters provided by said topology agent providing unit to convey communications from said source domain to said plurality of other domains, at least one negotiator agent operating unit of said plurality of negotiator agent operating units receiving information from said topology agent providing unit regarding a hop to a selected domain of said plurality of respective other domains and generating an agent in said selected domain for receiving instructions from the at least one negotiator agent operating unit, such that a path is established between said source domain and a destination domain; and
  (c) operating selected proxy agent operating units of said plurality of proxy agent operating units to configure at least one device, other than one of said plurality of proxy agent operating units, in said respective other domain to effect implementing quality of service policies received from said respective negotiator agent operating unit to effect said communications within said respective other domain; said at least one device being configured to include a framework for accepting industry standard parameters establishing said quality of service parameters.

16. The method for effecting communications among a plurality of devices situated in a plurality of domains as recited in claim 15 wherein said second domain is defined by a technology type.

17. The method for effecting communications among a plurality of devices situated in a plurality of domains as recited in claim 15 wherein said second domain is defined as including devices serviced by a respective gateway element.

18. The method for effecting communications among a plurality of devices situated in a plurality of domains as recited in claim 15 wherein said second domain is defined as including devices serviced by a respective quality of service technology.

19. The method for effecting communications among a plurality of devices situated in a plurality of domains as recited in claim 15 wherein said quality of service policies include at least one of a bandwidth limit and a priority level.

20. The method for effecting communications among a plurality of devices situated in a plurality of domains as recited in claim 15 wherein said second domain is defined as at least one of a technology type, as including devices serviced by a respective gateway element, and as including devices serviced by a respective quality of service technology, and wherein said quality of service policies include at least one of a bandwidth limit and a priority level.

\* \* \* \* \*